(12) United States Patent
Ray et al.

(10) Patent No.: US 7,295,545 B2
(45) Date of Patent: Nov. 13, 2007

(54) PPP CONNECTION DURING SIMPLE IP

(75) Inventors: Dipankar Ray, Dorval (CA); Louis Segura, St-Laurent (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 503 days.

(21) Appl. No.: 10/880,472

(22) Filed: Jul. 1, 2004

(65) Prior Publication Data

US 2006/0002358 A1    Jan. 5, 2006

(51) Int. Cl.
- H04B 7/216 (2006.01)
- H04J 3/24 (2006.01)
- H04J 3/16 (2006.01)
- H04Q 7/00 (2006.01)
- H04Q 7/20 (2006.01)

(52) U.S. Cl. ............... 370/342; 370/335; 370/349; 370/329; 370/437; 455/466; 455/458

(58) Field of Classification Search ............... 370/342, 370/335, 349, 329, 437; 455/466, 458
See application file for complete search history.

(56) References Cited

U.S. PATENT DOCUMENTS 7,224,674 B2 * 5/2007 Harris et al. ............... 370/329
2002/0055364 A1 * 5/2002 Wang et al. ............... 455/466
2002/0145990 A1 * 10/2002 Sayeedi ............... 370/335
2002/0167905 A1   11/2002 Wenzel et al. ............... 370/249
2004/0107294 A1 * 6/2004 Chen ............... 709/236
2004/0266450 A1 * 12/2004 Chowdhury ............... 455/452.2
2005/0037765 A1 * 2/2005 Rajkotia et al. ............... 455/450
2006/0056381 A1 * 3/2006 Kim ............... 370/349

* cited by examiner

Primary Examiner—Barry Taylor
(74) Attorney, Agent, or Firm—Alex Nicolaescu; Ericsson Canada, Inc.

(57) ABSTRACT

The invention relates to a method for maintaining a Point-to-Point Protocol (PPP) connection between a Mobile Terminal (MT) and a Packet Data Serving Node (PDSN). Responsive to a detection at the PDSN that the PPP connection between the PDSN and the MT is inactive, the method sends a first Link Control Protocol (LCP) Echo Request, which including a Short Data Burst (SDB) parameter, wherein the SDB parameter indicates that the message is sent using SDB, from the PDSN to a Base Station Controller/Packet Control Function (BSC/PCF) for locating the MT. The method further determines on the reception of SDB parameter, not to setup a traffic channel (TCH) between the MT and a serving BS. Next, the method sends from the BSC/PCF to the BS a second LCP Echo Request, which includes a NO Traffic Channel (No TCH) parameter instructing not to setup a traffic channel for the MT.

7 Claims, 2 Drawing Sheets

PPP CONNECTION DURING SIMPLE IP

BACKGROUND OF THE INVENTION

1. Field of the Invention

The present invention relates to a method for maintaining a Point-to-Point Protocol (PPP) connection between a mobile terminal and a Packet Data Serving Node (PDSN) in a packet data network.

2. Description of the Related Art

Nowadays, in a third generation (3G) network such as the International Mobile Telecommunications-2000 (IMT-2000) network defined by 3G Partnership Project 2 (3GPP2), whenever a Mobile Terminal (MT) needs to communicate with the 3G network, a Point-to-Point Protocol (PPP) session is established between the MT and a Packet Data Serving Node (PDSN) of the 3G network.

The PPP session consists of a data link protocol between the MT and the PDSN. The PPP session defines a period during which a particular PPP data packet connection instance is maintained in the open state in both the terminal and PDSN. In a CDMA2000 Packet Core Network (PCN), the PDSN is responsible for supporting authentication mechanisms and a configuration option to allow a terminal to receive Internet Protocol (IP) services such as VoIP (Voice over IP) and more generally voice/data multimedia over a wireless cellular network. The data link protocol involves two types of access methods: Simple IP and Mobile IP.

With Mobile IP, a home agent can reside in an International Mobile Telecommunications-2000 (IMT-2000) service provider network or in a private network. Each time the PPP connection is established, negotiation takes place with regards to authentication, compression, etc, followed by Agent advertisement and a MIP registration request in the case of MIP service. This involves the allocation of a traffic channel to the terminal by a Mobile Switching Center (MSC), a Base Station Controller/Packet Control Function (BSC/PCF) and a Base Station (BS). Furthermore, the PDSN maintains the PPP connection. Mobile IP service is implemented according to interim standard (IS) CDMA2000 Wireless IP Network Standard, TIA/EIA/IS-835 published in 2000 by the Telecommunications Industry Association (TIA) the communications sector of the Electronic Industries Alliance (EIA), which is included herewith by reference, and provides Mobile IP-capable terminal with IP network access and full mobility. Inter-PDSN handoffs are supported in this mode of operation. Mobile IP is described in the Internet Engineering Task Force (IETF) document Request for Comments (RFC)-2002 (IP Mobility Support), published in 2002, which is included herewith by reference. RFC-2002 specifies protocol enhancements that allow transparent routing of packet data to mobile nodes in the Internet. Each MT is always identified by its home address, regardless of its current point of attachment to the Internet. While located away from its home network, a mobile terminal is also associated with a care-of address, which provides information about its current point of attachment to the Internet. The protocol provides for registering the care-of address with the HA. The HA sends packet data destined for the mobile terminal through a tunnel to the care of address. After arriving at the end of the tunnel, each packet data is then delivered to the MT.

In Mobile IP, the PPP session is also maintained during a period when the PPP data packet connection is dormant. A dormant PPP connection is one in which a packet data session has been established, but no data has been exchanged for a long period of time. For example, a terminal may download information from the PDSN, and then spend a considerable amount of time reading it. Under these circumstances, in Mobile IP, when an inactivity timer expires, the MSC deallocates the radio traffic channel. The PPP session, however, is maintained between the MT and the PDSN. If the MT requests or sends additional data, the dormant PPP connection is reactivated by reallocating a traffic channel so that the data can be transferred. Furthermore, if the MT hands off from the RAN to another RAN but is still connected to the same PDSN, the original PPP connection is maintained. If a MT changes PDSN, a new PPP connection is created with the new PDSN. Doing this in Mobile IP saves network resources.

In Simple IP, the IP address is dynamically assigned to a MT from the network and the Internet access is performed directly. With Simple IP, mobility is maintained with the same IP address as long as the MT is served by the same PDSN. As soon as the MT moves to a different PDSN, the session is terminated and a new session must be re-established with the new serving PDSN. IS-835 defines that Simple IP has no provision to allow PDSN changes during a given MT/PDSN session. Simple IP includes some PDSN to PDSN protocol enhancements to provide better mobility performance over previous standards, but still remains limited compared to Mobile IP. Simple IP will continue to be used in 3G networks such as CDMA2000 network for backward compatibility. Since the IP address is fixed and the address of a terminal using Simple IP changes only when its location changes. The PDSN provides an IP address for Simple IP by interacting with an external entity like a RADIUS server.

In Simple IP, the PPP session can be maintained via an Always On service in which a MT is allowed to permanently maintain a PPP data packet connection once it is established. However, such a service is consuming network resources. The resource management in Simple IP is not defined, since an Always On user will always have the PPP session activated unless it is terminated by its home network or if the terminal becomes unreachable.

Reference is now made to FIG. 1, which illustrates a nodal operation and signal flow diagram illustrating a flow of messages of a method for maintaining a PPP packet data connection for a MT 10 in an exemplary CDMA2000 network 100 as known in the art. The MT 10 is identified with—a unique identity—an International Mobile Subscriber Identity (IMSI) 106. The network 100 comprises a BS 12, a co-located Base Station Controller/Packet Control Function (BSC/PCF) 14 and a PDSN 16. The BSC and the PCF may be co-located or may be also used as standalone nodes. The PDSN 16 provides packet data services to the MT 10 via a PPP connection as defined in interim standard (IS), Interoperability Specifications (IOS) for CDMA2000 Access Network Interfaces, TIA/EIA/IS-2001-A published in 2000 by the TIA/EIA, which is included herewith by reference. The BS 12, among other things, provides a radio access for the MT 10, and the BSC/PCF 14 decides which PDSN to send the traffic through.

The flow of messages begins when MT 10 sends an origination message 104 to the BS 12 to request packet data service. The origination message 104 includes the IMSI 106 of the MT 10. The BS 12 may assign a traffic channel (TCH) 108 to the MT 10 prior to, or in parallel with, All messages for establishing the PPP connection (not shown) and the beginning of a reception of Always On indicator from a home AAA (not shown). The BSC/PCF 12 uses the IMSI 106 of the MT 10 as is well known in the art, using modulo-(number of possible PDSNs) arithmetic on the result to decide which PDSN to use from a list of PDSN IP addresses. Thus, unless the list of possible PDSNs changes, the BSC/PCF 12 will always choose the same PDSN for a given IMSI. In this exemplary scenario, the BSC/PCF 12 chooses the PDSN 16 and sends messages (not shown) for negotiating the PPP session for the MT 10. At step 112

In the network 100, a PPP connection 116 is established between the MT 10 and the PDSN 16. The PPP connection 116 is established between the MT 10 and the PDSN 16 as described in IS-2001. Consequently, the network 100 becomes the serving network for the MT 10. The PDSN 16 is remotely or directly connected to a home Authentication, Authorization, and Accounting AAA (not shown) in the home network (not shown) based on agreements between network operators if necessary. The network may use Mobile IP signaling or Simple IP signaling CDMA2000 network.

SDB is defined in CDMA2000 as messages or data associated with a data service that consist of a small number of frames that are transmitted to or from an MT with a dormant packet data service instance. Short Data Bursts are not supported across packet zone boundaries. Data may be lost if an MT moves to a new packet zone shortly after transmitting a SDB. Mobile terminated data may also be lost if a SDB is sent to the BS/PCF from the PDSN, but the MT moves to a new packet zone before the data is transmitted to the MT. In a CDMA 2000 network, the BS shall ensure that multiple mobile originated SDBs from the same MT shall be sent to the BSC/PCF in the order in which they were received from the MT. The PDSN may indicate suitability of a packet for short data burst transmission via an attribute in its Generic Routing Encapsulation (GRE) frame during the PPP connection as defined by the 3GPP2.

The network 100 has the ability to maintain a PPP packet data session 116 for the MT 10 (step 120) during Simple IP signaling. The MT 10 can have the Always On feature activated in its subscriber profile or the user may activate via the MT 10 this feature for maintaining the PPP packet data connection 116. This can be done during initial authorization of the MT 10 from the home AAA at PPP connection set up.

Consequently, the PDSN 16 maintains the PPP session of the MT 10 until it receives an indication that the PPP connection 116 is inactive or that the Always On feature for the MT 10 has been terminated. PPP resource management in the PDSN 116 could be requested to clear up any unwanted PPP resources due to Always On feature, especially if the PPP inactivity timer is set to a large value. Since Always On is a subscriber service, an indicator should be sent back to home AAA in a Usage Data Record (UDR) for informing the AAA that the PPP timer has lapsed. At step 127, the PDSN 16 detects that the PPP is inactive and starts a PPP connection inactivity timer at step 128. This determination is made when the PDSN stops receiving data from or for the MT 10. If the BSC/PCF 14 supports SDB, the BSC/PCF 14 sends a Support message that comprises a parameter (SDB 125) for indicating that the BSC/PCF 14 supports SDB. After reaching a determined threshold value at the PPP inactivity timer, the PDSN 16 sends to the BSC/PCF 14 a Link Control Protocol (LCP) Echo Request 132 for determining if the MT 10 is still located in the network 100. The LCP Echo Request 132 is sent with a value or a clock defined in the timer. In document RFC 1661 by IETF and IS-835 by TIA/EIA, which are both included herewith by reference, the general content of the purpose of Echo Request and Echo reply is described.

After sending the LCP Echo Request 132, the PDSN 16 starts an Echo Reply timeout timer 138, at step 136. If the PDSN 16 does not receive a LCP Echo Reply from the BSC/PCF 14 after the expiry of a determined threshold in the timeout timer 138, the PDSN 16 sends again the same LCP Echo Request until it gets a LCP Echo Reply. The PDSN also initializes an Echo Request-Retries counter 142 (step 140) for counting the number of Echo Requests sent.

Upon reception of the LCP Echo Request 132 the BSC/PCF sends an Echo Request 144 to the BS 12. Following this, the BS 12 assigns a TCH 148 for the MT 10. Setting up a TCH is costly and requires a large amount of signaling. Then the BS 12 sends a LCP Echo Request 152 to the MT 10. Next, the MT 10 answers the LCP Echo 152 Request by sending an LCP Echo Reply 160 including a MT present parameter 158 to the BS 12. The BS 12 in return ultimately replies to the LCP Echo Request 132 with a LCP Echo Reply 164 indicating that the MT 10 is available. Upon reception of the LCP Echo Reply 160, the PDSN 16 then knows that the MT 10 is located in its serving area.

A solution for decreasing the amount of signaling and therefore the usage of network resources (e.g. MSC, BS, BSC/PCF and PDSN) in network 100 can be to allow the PDSN 16 to tear down the PPP connection 116 based on a determination made based on the number of unanswered LCP Echo Requests (e.g. three attempts) from the PDSN 20 to the BSC/PCF 14, which would result in the tear down of the PPP connection 116. For instance, the MT 10 can be busy or MT 10 may have change location. But, because Simple IP connectivity is used and the Always On feature is activated, the PDSN 16 is not allowed to tear down the PPP connection 116 and the PDSN 16 will continue to generate LCP Echo request until it receives a LCP Echo Reply message from the MT 10. Therefore, this represents a considerable amount of signaling in the network 100.

For these reasons, there is a need to provide a way to save network resources during Simple IP when an Always On feature is provided to a user. The invention provides a solution to that problem.

SUMMARY OF THE INVENTION

It is therefore one broad object of this invention to provide a method for maintaining a Point-to-Point Protocol (PPP) connection between a Mobile Terminal (MT) and a Packet Data Serving Node (PDSN), the method comprising the steps of:
responsive to a detection at the PDSN that the PPP connection between the PDSN and the MT is inactive, receiving at a Base Station Controller/Packet Control Function (BSC/PCF) a first Link Control Protocol (LCP) Echo Request from the PDSN for locating the MT, the first LCP Echo Request message including a Short Data Burst (SDB) parameter, wherein the SDB parameter indicates that the message is sent using SDB;
determining at the BSC/PCF based on the reception of SDB parameter, not to setup a traffic channel (TCH) between the MT and a serving BS; and
sending from the BSC/PCF a second LCP Echo Request to the BS, the LCP Request including a NO Traffic Channel (No TCH) parameter instructing not to setup a traffic channel for the MT.

It is therefore another broad object of his invention to provide a BSC/PCF for supporting SDB during a PPP connection between a PDSN and the MT, wherein responsive to a detection at the PDSN that the PPP connection between the PDSN and the MT is inactive, the BSC/PCF receives from the PDSN a Link Control Protocol (LCP) Echo Request for locating the MT, the LCP Echo Request including a SDB parameter, wherein the SDB parameter indicates that the message is sent using SDB, and wherein the BSC/PCF further determines based on the reception of SDB parameter, not to setup a traffic channel (TCH); and sends a LCP Request to the MT a LCP Echo request, the LCP Request including a NO Traffic Channel (No TCH) parameter indicating that it is not necessary to setup a traffic channel for the MT.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
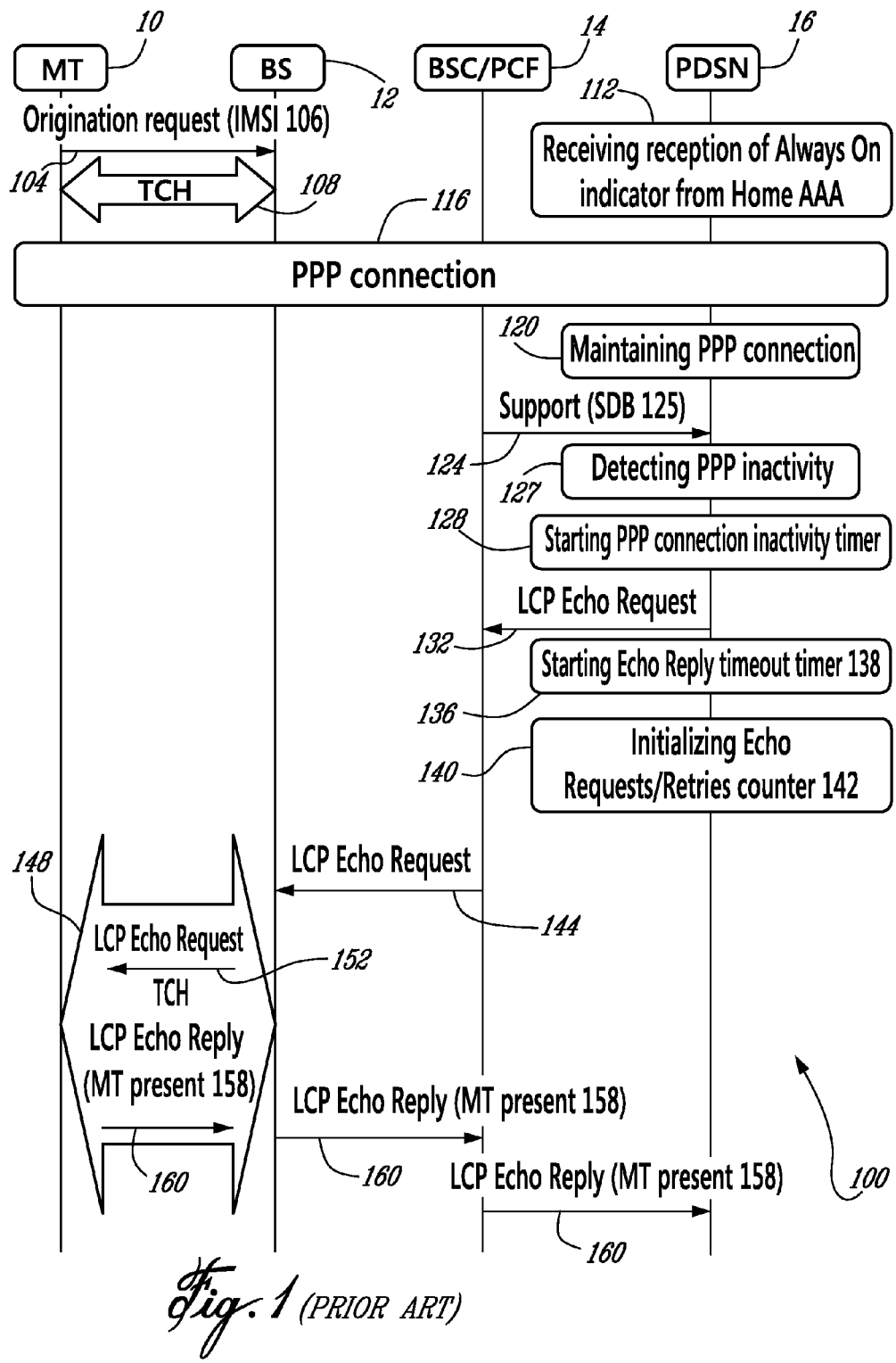
FIG. 1 is a nodal operation and signal flow diagram illustrating a flow of messages of a method for maintaining a Point-to-Point Protocol (PPP) packet data connection for a Mobile Terminal in an exemplary CDMA2000 network 100 as known in the art.
Figure 2:
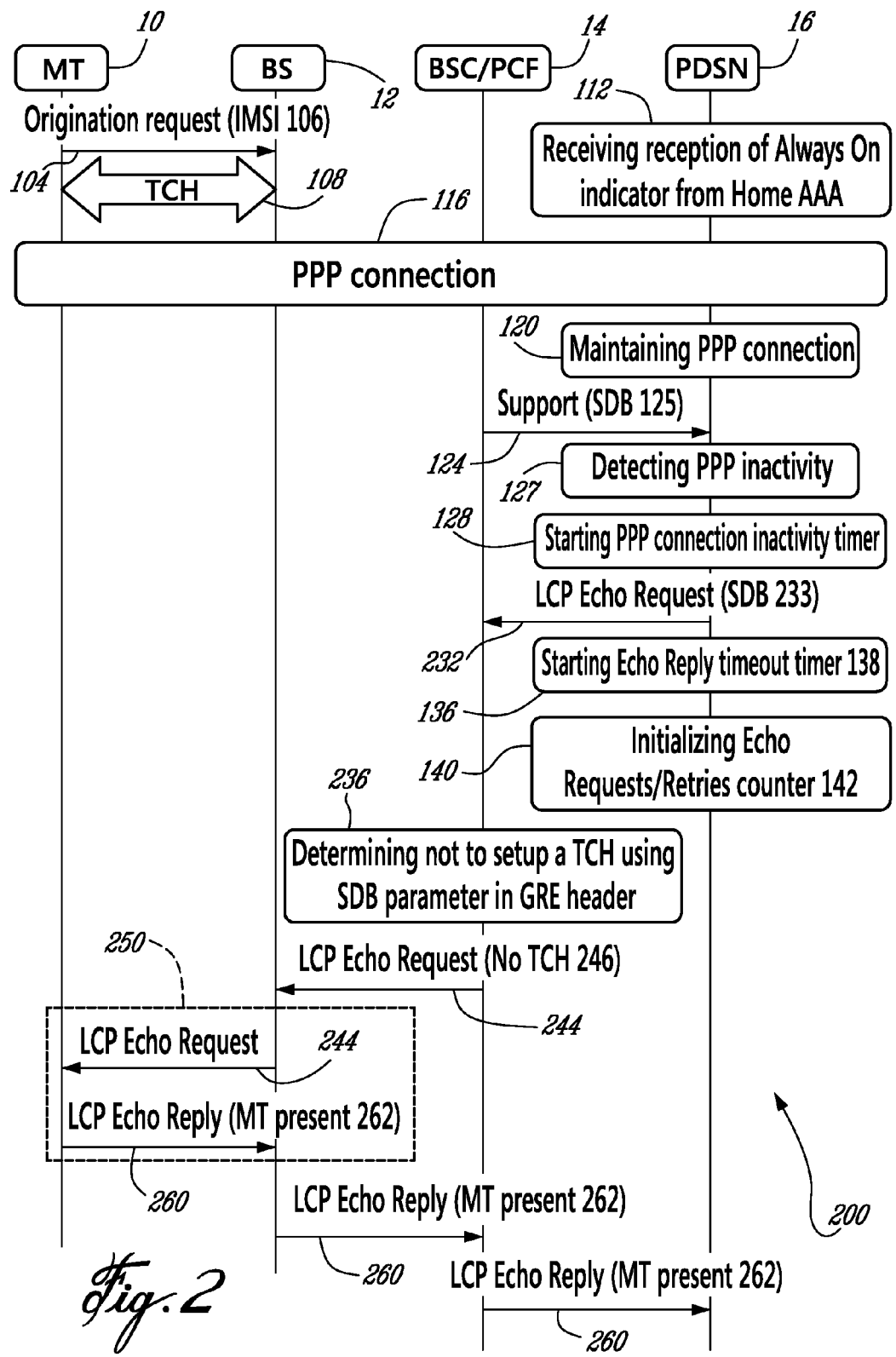
FIG. 2 is a nodal operation and signal flow diagram illustrating a flow of messages of a method for maintaining a PPP packet data connection for a Mobile Terminal in third generation (3G) network in accordance to the invention.

Reference is now made to FIG. 2, which illustrates a nodal operation and signal flow diagram illustrating a flow of messages of a method for maintaining a Point-to-Point Protocol (PPP) packet data connection for a Mobile Terminal (MT) 10 in a packet data telecommunications network 200 in accordance to the invention. The MT 10 is identified with—a unique identity—an International Mobile Subscriber Identity (IMSI) 106. The network 200 comprises a Base Station (BS) 12, a co-located Base Station Controller BSC/Packet Control Function (BSC/PCF) 14 and a Packet Data Serving Node (PDSN) 16. The BSC and the PCF may be co-located or may be also used as standalone nodes. The PDSN 16 provides packet data services to the MT 10 via a PPP connection as defined in IS-2001. The BS 12, among other things, provides a radio access for the MT 10, and the BSC/PCF 14 decides which PDSN to send the traffic through.

The flow of messages begins when the MT 10 sends an origination message 104 to the BS 12 to request packet data service. The origination message 104 includes the IMSI 120 of the MT 10.The BS 12 may assign a traffic channel (TCH) 108 to the MT 10 prior to, or in parallel with, All messages (not shown) for establishing the PPP connection and the beginning of a reception of Always On indicator from a home AAA (not shown).

The BSC/PCF 14 uses the IMSI 106 of the MT 10 as is well known in the art, using modulo-(number of possible PDSNs) arithmetic on the result to decide which PDSN to use from a list of PDSN IP addresses. Thus, unless the list of possible PDSNs changes, the BSC/PCF 14 will always choose the same PDSN for a given IMSI. In this exemplary scenario, the BSC/PCF 14 chooses the PDSN 16 and sends messages (not shown) for negotiating the PPP session for the MT 10.

In the network 200 a PPP connection 116 is established between the MT 10 and the PDSN 16. The PPP connection 116 is established between the MT 10 and the PDSN 16 as described in the IS-2001 standards, which is included herewith by reference. Consequently, the network 200 becomes the serving network for the MT 10. The network 100 may be the home network or the visited network of the MT 10 if the MT 10 is roaming. If the network 200 is the visited network then the PDSN 20 is remotely connected to a home Authentication, Authorization, and Accounting AAA (not shown) in the home network (not shown) based on agreements between network operators if necessary. However, if the network 200 is the home network, then the PDSN is directly connected to the home AAA. The network 200 is described as a CDMA2000 network, but can be any packet data network such as a 3G network using Mobile IP signaling or Simple IP signaling. For that reason, it can be understood that any 3G network such as any IMT-2000 network with IP mobility solution using Mobile IP signaling or Simple IP signaling could have been used instead of the CDMA2000 network.

The network 200 has the ability to maintain a PPP packet data session 116 for the MT 10 (step 120) during Simple IP signaling. The MT 10 can have the Always On feature activated in its subscriber profile or the user may activate via the MT 10 this feature for maintaining the PPP packet data connection 116. This can be done during initial authorization of the MT 10 from the home AAA at PPP connection set up.

Prior to the set up of the PPP connection 116 and during the initial user authorization at PPP connection setup an AAA (not shown) informs the PDSN 16 that an Always On feature is activated for the MT 10 by sending an F15 indicator in an A11 message (not shown), at step 112. The F15 indicator is described in the following table.

| F15 | Always On | Vendor Type | 4 | Integer | 3GPP2 Always On | Vendor value 0-Inactive 1-Active Always On 0 = No Always On Service 1 = Always On |
|---|---|---|---|---|---|---|

Consequently, the PDSN 16 maintains the PPP session of the MT 10 until it receives an indication that the PPP connection 116 is inactive or that the Always On feature for the MT 10 has been terminated. PPP resource management in the PDSN 16 could be requested to clear up any unwanted PPP resources due to "Always On" feature, especially if the PPP inactivity timer is set to a large value. Since "Always On" is a subscriber service, an indicator should be sent back to home AAA in a Usage Data Record (UDR) for informing the AAA that the PPP timer has lapsed. At step 127, the PDSN 16 detects that the PPP is inactive and starts a PPP connection inactivity timer at step 128. This determination is made when the PDSN stops receiving data from or for the MT 10.

If the BSC/PCF 14 supports SDB, the BSC/PCF 14 sends a Support message 124 that comprises a parameter (SDB 125) for indicating that the BSC/PCF 14 supports SDB. Following this, the PDSN 16 processes the message 124 and sends to the BSC/PCF 14 a LCP Echo Request 232 for determining whether the MT 10 is located in the network 200. The LCP Echo Request 232 is sent based on threshold value determined at the PPP inactivity timer. The LCP Echo Request 232 includes a SDB parameter 233 included in the GRE header. It can be understood that the SDB indication included in a GRE header of a message for informing a receiving network element that the message is for SDB is not only limited to LCP Requests. But can be included in any PDSN initiated message. The SDB parameter 125 indicates to the BSC/PCF 14 and further to the BS 12 that a TCH does not need to be set up for the Request 232. Not setting up a TCH, avoids unnecessary signaling in the network 200.

After sending the LCP Echo Request 232, the PDSN 16 starts an Echo Reply timeout timer 138, at step 136. If the PDSN 16 does not receive a LCP Echo Reply from the BSC/PCF 14 after the expiry of a determined threshold in the timeout timer 138, the PDSN 16 sends again the same LCP Echo Request 232 including the SDB parameter 233 until it gets a LCP Echo Reply. The PDSN 16 also initializes an Echo Request-Retries counter 142 (step 140) for counting the number of Echo Requests sent (e.g. Echo Request 232).

Upon reception of the LCP Echo Request 232 the BSC/PCF 14 determines based on the SDB parameter 233 in the GRE header of the LCP Echo Request 232 that a TCH such as the TCH 108 is not necessary (step 236). Thus the method avoids unnecessary signaling by not setting up a traffic channel. Next the BSC/PCF 14 generates and sends a LCP Echo Request 244 to the BS 12. The LCP Echo Request 244 includes an indication (No TCH 246) for informing the BS 12 that assigning a TCH for the MT 10 is not necessary. After receiving and processing the LCP Echo Request 244, the BS 12 does not assign a TCH and directly sends on a common channel signaling (CCHS) 250 between the MT 10 and the BS 12 the LCP Echo request 244 to the MT 10. Next, the MT 10 replies to the LCP Echo Request with a LCP Echo Reply including a MT present parameter (MT present 262) for indicating his presence to the BS 12. The BS 12 further forwards the reply 260 to the BSC/PCF 14, which further transmits this to the PDSN 16. Upon reception of the LCP Echo Reply at the PDSN 16, the PDSN then knows hat the MT 10 is located in its serving area.

Although several preferred embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for maintaining a Point-to-Point Protocol (PPP) connection between a Mobile Terminal (MT) and a Packet Data Serving Node (PDSN), the method comprising the steps of:

responsive to a detection at the PDSN that the PPP connection between the PDSN and the MT is inactive, receiving at a Base Station Controller/Packet Control Function (BSC/PCF) a first Link Control Protocol (LCP) Echo Request from the PDSN for locating the MT, the LCP Echo Request including a Short Data Burst (SDB) parameter, wherein the SDB parameter indicates that the message is sent using SDB;

determining at the BSC/PCF based on the reception of SDB parameter, that a setup of a traffic channel (TCH) between the MT and a serving BS is to be avoided; and sending from the BSC/PCF a second LCP Echo Request to a Base Station (BS), the LCP Request including a NO Traffic Channel (No TCH) parameter for preventing a setup of a TCH for the MT.

2. The method of claim 1, wherein the first LCP Echo Request is triggered by a PPP connection inactivity timer.

3. The method of claim 1, wherein the step of sending includes the steps of:

starting at the PDSN an Echo Reply timeout timer; and initializing at the PDSN an Echo Request-Retries counter.

4. The method of claim 1, wherein the step of sending further comprises the steps of:

using a common channel signaling between the MT and the BS; and sending in SDB a LCP Echo Reply from the MT to the PDSN, the LCP Echo Reply including a MT present parameter indicating that the MT is present and that the PDSN does not need to send another LCP Echo Request.

5. A Base Station Controller/Packet Control Function (BSC/PCF) for supporting Short Data Burst (SDB) during a Point-to-Point Protocol (PPP) connection between a Packet Data Serving Node (PDSN) and the MT, wherein responsive to a detection at the PDSN that the PPP connection between the PDSN and the MT is inactive, the BSC/PCF receives from the PDSN a Link Control Protocol (LCP) Echo Request for locating the MT, the LCP Echo Request including a SDB parameter, wherein the SDB parameter indicates that the message is sent using SDB, and wherein the BSC/PCF further determines based on the reception of SDB parameter, that a setup a traffic channel (TCH) is to be avoided; and sends a LCP Request to the MT a LCP Echo request, the LCP Request including a NO Traffic Channel (No TCH) parameter for preventing a setup of a TCH for the MT.

6. The BSC/PCF of claim 5, wherein the BSC/PCF further receives in SDB a LCP Echo Reply from the BS, the LCP Echo Reply including a MT present parameter indicating that the MT is present.

7. The BSC/PCF of claim 6, wherein the BSC/PCF further sends to the PDSN the LCP Echo Reply for indicating the presence of the MT in the serving area of the PDSN.

* * * * *

UNITED STATES PATENT AND TRADEMARK OFFICE
CERTIFICATE OF CORRECTION

PATENT NO. : 7,295,545 B2 Page 1 of 1
APPLICATION NO. : 10/880472
DATED : November 13, 2007
INVENTOR(S) : Ray et al.

It is certified that error appears in the above-identified patent and that said Letters Patent is hereby corrected as shown below:

In Column 2, Line 62, delete "All" and insert -- A11 --, therefor.

In Column 3, Line 6, delete "10. At step 112" and insert -- 10 at step 112. --, therefor.

In Column 5, Line 61, delete "All" and insert -- A11 --, therefor.

In Column 8, Line 44, after "setup" insert -- of --.

Signed and Sealed this

Ninth Day of September, 2008

JON W. DUDAS
*Director of the United States Patent and Trademark Office*